(12) United States Patent
Agrawal et al.

(10) Patent No.: US 12,614,551 B2
(45) Date of Patent: Apr. 28, 2026

(54) PRESENTING RELEVANT AUDIO DATA

(71) Applicant: Motorola Mobility LLC, Chicago, IL (US)

(72) Inventors: Amit Kumar Agrawal, Bangalore (IN); Himanshu Chug, Bangalore (IN); Shivam Raj, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 92 days.

(21) Appl. No.: 18/645,040

(22) Filed: Apr. 24, 2024

(65) Prior Publication Data

US 2025/0336397 A1     Oct. 30, 2025

(51) Int. Cl.
*G10L 15/22* (2006.01)
*G10L 15/08* (2006.01)
*G10L 21/0208* (2013.01)

(52) U.S. Cl.
CPC .............. *G10L 15/22* (2013.01); *G10L 15/08* (2013.01); *G10L 21/0208* (2013.01); *G10L 2015/088* (2013.01); *G10L 2015/221* (2013.01)

(58) Field of Classification Search
CPC ....... G06F 3/16; G06F 3/165; G10L 15/1822; G10L 15/26; H04R 5/033
See application file for complete search history.

(56) References Cited

U.S. PATENT DOCUMENTS

| | | | |
|---|---|---|---|
| 5,524,169 A | 6/1996 | Cohen et al. | |
| 5,673,325 A | 9/1997 | Andrea et al. | |
| 6,463,316 B1 | 10/2002 | Brungart | |
| 8,447,045 B1 | 5/2013 | Laroche | |
| 8,526,628 B1 | 9/2013 | Massie et al. | |
| 8,553,900 B2 | 10/2013 | Cheah et al. | |
| 8,571,227 B2 | 10/2013 | Donaldson et al. | |
| 8,611,552 B1 | 12/2013 | Murgia et al. | |
| 8,848,935 B1 | 9/2014 | Massie et al. | |
| 9,014,387 B2 | 4/2015 | Hendrix et al. | |
| 9,020,160 B2 | 4/2015 | Gauger, Jr. | |
| 9,319,781 B2 | 4/2016 | Alderson et al. | |
| 9,398,367 B1 | 7/2016 | Scott et al. | |
| 9,741,334 B2 | 8/2017 | Park et al. | |
| 9,843,672 B1 * | 12/2017 | Agrawal ........... H04M 1/72436 |
| 9,843,673 B1 | 12/2017 | Chug et al. | |
| 9,892,722 B1 | 2/2018 | Bastyr et al. | |
| 9,961,435 B1 * | 5/2018 | Goyal .................. H04R 1/1083 |

(Continued)

OTHER PUBLICATIONS

Agrawal, Amit Kumar , et al., "Pursuant to MPEP § 2001.06(b) the applicant brings the following co-pending application to the Examiner's attention:", U.S. Appl. No. 18/645,031, filed Apr. 24, 2024, 51 pages.

(Continued)

*Primary Examiner* — Daniel Abebe
(74) *Attorney, Agent, or Firm* — FIG. 1 Patents

(57) ABSTRACT

In aspects of presenting relevant audio data, a mobile device implements an audio playback manager that monitors audio in an environment for a trigger word. The audio playback manager detects the trigger word via a microphone associated with a headset in communication with a mobile device. The audio playback manager determines whether a portion of the audio preceding the trigger word is relevant to a user of the mobile device and presents the portion of the audio that is relevant to the user.

20 Claims, 12 Drawing Sheets

(56)                References Cited

U.S. PATENT DOCUMENTS

| | | | |
|---|---|---|---|
| 10,681,453 | B1 | 6/2020 | Meiyappan et al. |
| 11,302,329 | B1* | 4/2022 | Sun .......................... G10L 25/51 |
| 11,699,424 | B2 | 7/2023 | Chen |
| 2001/0036283 | A1 | 11/2001 | Donaldson |
| 2005/0249355 | A1 | 11/2005 | Chen et al. |
| 2006/0013408 | A1 | 1/2006 | Lee |
| 2006/0153394 | A1 | 7/2006 | Beasley |
| 2008/0267416 | A1* | 10/2008 | Goldstein ................ H04R 3/00 |
| | | | 381/56 |
| 2009/0136052 | A1 | 5/2009 | Hohlfeld et al. |
| 2010/0131269 | A1 | 5/2010 | Park et al. |
| 2011/0007907 | A1 | 1/2011 | Park et al. |
| 2011/0170699 | A1 | 7/2011 | Schoerkmaier |
| 2011/0211707 | A1 | 9/2011 | Fuller |
| 2011/0222700 | A1 | 9/2011 | Bhandari |
| 2012/0177213 | A1 | 7/2012 | Le Faucheur |
| 2013/0208908 | A1 | 8/2013 | Theiler et al. |
| 2013/0259253 | A1 | 10/2013 | Alves et al. |
| 2013/0287219 | A1 | 10/2013 | Hendrix et al. |
| 2013/0329901 | A1 | 12/2013 | Theiler |
| 2014/0044275 | A1 | 2/2014 | Goldstein et al. |
| 2014/0211970 | A1 | 7/2014 | Sibbald et al. |
| 2014/0314241 | A1 | 10/2014 | Penhune |
| 2014/0337131 | A1 | 11/2014 | Edara |
| 2015/0023516 | A1 | 1/2015 | Rabii et al. |
| 2015/0055789 | A1 | 2/2015 | Bernal Castillo et al. |
| 2015/0189434 | A1 | 7/2015 | Hendrix et al. |
| 2015/0222977 | A1 | 8/2015 | Angel, Jr. |
| 2016/0125866 | A1 | 5/2016 | Park et al. |
| 2016/0330546 | A1 | 11/2016 | Barrentine et al. |
| 2016/0373861 | A1 | 12/2016 | Poulsen et al. |
| 2017/0148466 | A1 | 5/2017 | Jackson et al. |
| 2017/0347180 | A1 | 11/2017 | Petrank |
| 2018/0091883 | A1 | 3/2018 | Howes et al. |
| 2018/0091886 | A1 | 3/2018 | Liu et al. |
| 2018/0115815 | A1 | 4/2018 | Kumar et al. |
| 2018/0182371 | A1 | 6/2018 | Thormundsson et al. |
| 2019/0069074 | A1 | 2/2019 | Yamkovoy |
| 2019/0130930 | A1 | 5/2019 | Tong et al. |
| 2019/0272831 | A1 | 9/2019 | Kajarekar |
| 2019/0370283 | A1* | 12/2019 | Church ..................... G06N 3/08 |
| 2019/0378491 | A1 | 12/2019 | Mohammad et al. |
| 2020/0058287 | A1 | 2/2020 | Pinter |
| 2020/0068289 | A1 | 2/2020 | Ozluturk |
| 2020/0241834 | A1* | 7/2020 | Boeen ..................... G10L 25/51 |
| 2020/0374629 | A1 | 11/2020 | Pyatt et al. |
| 2021/0373848 | A1 | 12/2021 | Reily et al. |
| 2022/0078543 | A1 | 3/2022 | Kulavik et al. |
| 2022/0277722 | A1 | 9/2022 | Chen |
| 2022/0345833 | A1* | 10/2022 | Leong ................. H04R 25/554 |
| 2023/0054927 | A1 | 2/2023 | Hsu et al. |
| 2023/0064906 | A1* | 3/2023 | Jamieson ............... G08B 21/02 |
| 2023/0091495 | A1 | 3/2023 | Hasan et al. |
| 2023/0131573 | A1 | 4/2023 | Hsu et al. |
| 2023/0146322 | A1 | 5/2023 | Rui et al. |
| 2023/0215416 | A1 | 7/2023 | Chen et al. |
| 2023/0267908 | A1 | 8/2023 | Wurtz et al. |
| 2023/0328423 | A1 | 10/2023 | Olaleye |
| 2023/0396917 | A1 | 12/2023 | Robertson |
| 2024/0013765 | A1 | 1/2024 | Ebenezer et al. |
| 2024/0105156 | A1* | 3/2024 | Lovitt .................... H04R 1/406 |
| 2024/0127804 | A1* | 4/2024 | Shirodkar .......... G10L 15/1807 |
| 2025/0111848 | A1* | 4/2025 | Cella .................... H04R 1/1016 |
| 2025/0113135 | A1* | 4/2025 | Bezen ..................... G06F 3/016 |
| 2025/0335149 | A1 | 10/2025 | Agrawal et al. |
| 2025/0335150 | A1 | 10/2025 | Agrawal et al. |

OTHER PUBLICATIONS

Agrawal, Amit Kumar , et al., "Pursuant to MPEP § 2001.06(b) the applicant brings the following co-pending application to the Examiner's attention:", U.S. Appl. No. 18/645,044, filed Apr. 24, 2024, 51 pages.

Liu, Miaoqiong (Season) , "Global TWS Earbuds forecast in 2023", Linkedin, retrieved from the internet on Apr. 24, 2024, <https://www.linkedin.com/pulse/market-global-tws-earbuds-forecast-2023-season-liu>, Sep. 27, 2022, 7 pages.

Non-Final Office Action issued in U.S. Appl. No. 18/645,031, mailed Dec. 19, 2025, 13 pages.

Non-Final Office Action issued in U.S. Appl. No. 18/645,044, mailed Nov. 21, 2025, 16 pages.

Corrected Notice of Allowability issued in U.S. Appl. No. 18/645,044, mailed Feb. 18, 2026, 2 pages.

Notice of Allowance issued in U.S. Appl. No. 18/645,031, mailed Mar. 10, 2026, 9 pages.

Notice of Allowance issued in U.S. Appl. No. 18/645,044, mailed Feb. 9, 2026, 15 pages.

* cited by examiner

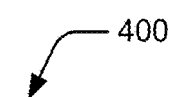
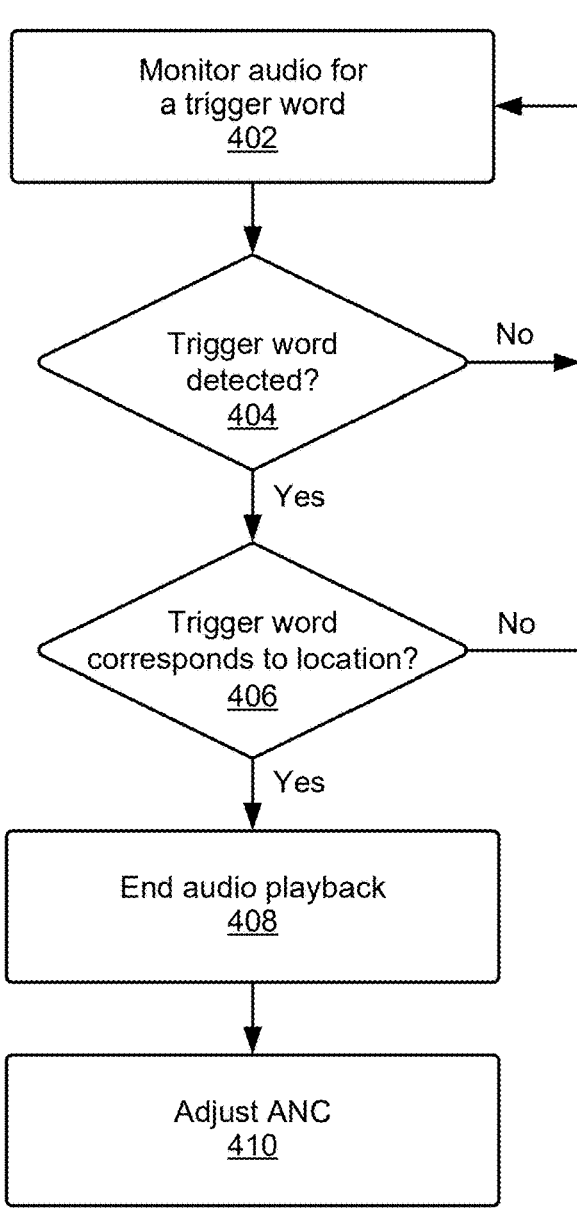
*FIG. 4*

800

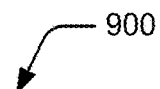

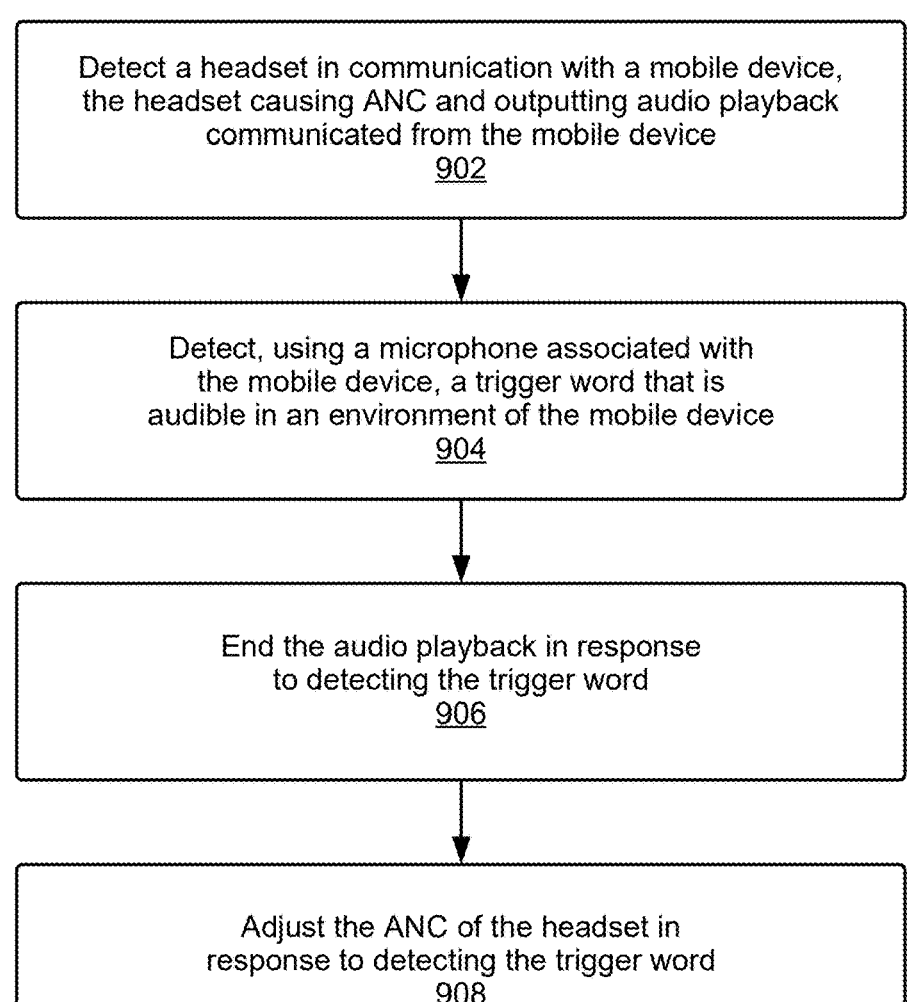

Detect a headset in communication with a mobile device,
the headset causing ANC and outputting audio playback
communicated from the mobile device
902

Detect, using a microphone associated with
the mobile device, a trigger word that is
audible in an environment of the mobile device
904

End the audio playback in response
to detecting the trigger word
906

Adjust the ANC of the headset in
response to detecting the trigger word
908

*FIG. 9*

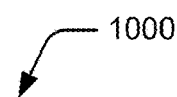
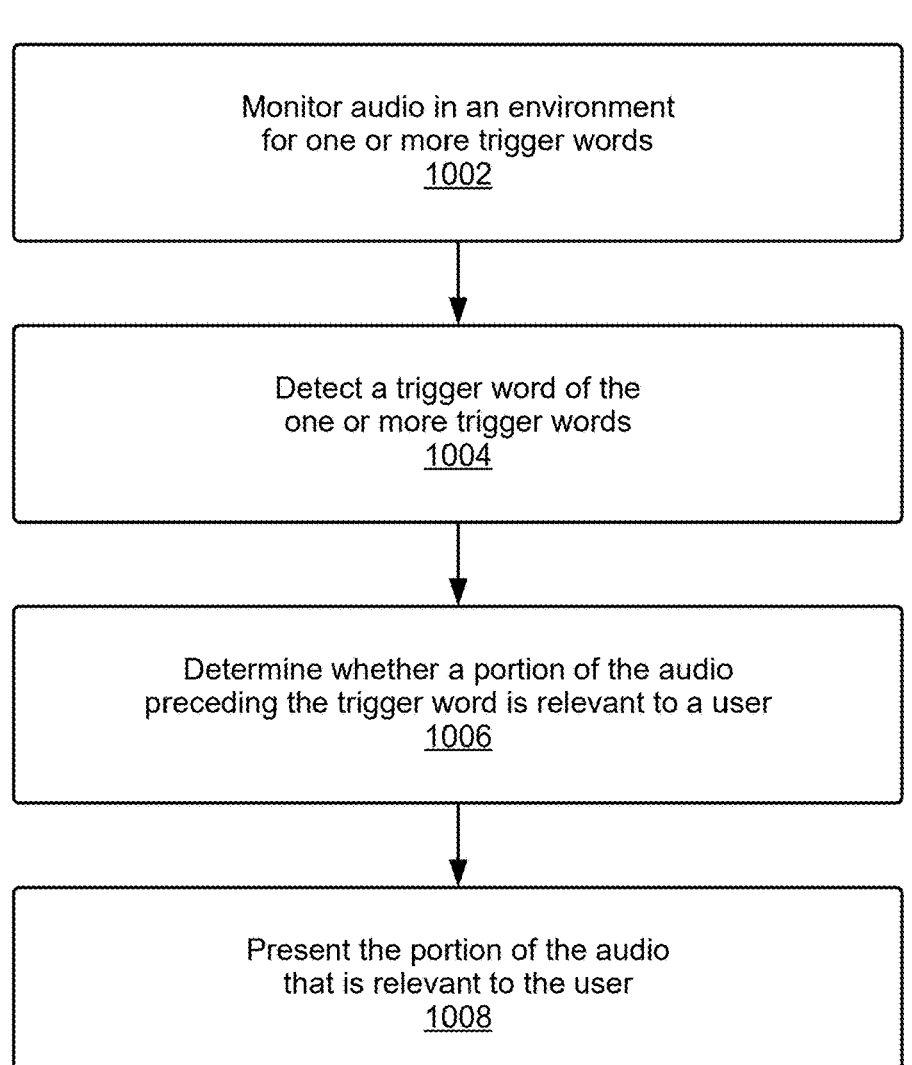
Monitor audio in an environment
for one or more trigger words
1002
Detect a trigger word of the
one or more trigger words
1004
Determine whether a portion of the audio
preceding the trigger word is relevant to a user
1006
Present the portion of the audio
that is relevant to the user
1008
*FIG. 10*

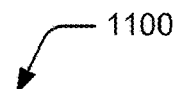

```
┌─────────────────────────────────────────┐
│  Detect a headset employing ANC of audio │
│  in communication with the mobile device │
│  in an environment of the mobile device  │
│                  1102                     │
└─────────────────────────────────────────┘
                     │
                     ▼
┌─────────────────────────────────────────┐
│  Receive a selection of at least one     │
│  audio source that triggers adjustment   │
│  of the ANC                              │
│                  1104                     │
└─────────────────────────────────────────┘
                     │
                     ▼
┌─────────────────────────────────────────┐
│  Detect sound originating from the at    │
│  least one audio source that triggers    │
│  adjustment of the ANC                   │
│                  1106                     │
└─────────────────────────────────────────┘
                     │
                     ▼
┌─────────────────────────────────────────┐
│  Adjust the ANC based on detecting the   │
│  sound originating from the at least one │
│  audio source                            │
│                  1108                     │
└─────────────────────────────────────────┘
```

FIG. 11

PRESENTING RELEVANT AUDIO DATA

BACKGROUND

Use of headsets in conjunction with mobile devices has become quite common. These headsets allow individuals to hear various different audible media (e.g., music, podcasts, sound accompanying video, and the like) without that media annoying others and/or while maintaining the confidentiality of the media. The development of active noise cancellation (ANC) for such headsets has been a particularly welcome development since ANC limits the amount of ambient noise heard by users of the headsets, which, in turn, allows users to better hear audible media or other sounds from the headsets. While ANC is generally a desirable feature of a headset, ANC may be desirable by a user in some circumstances, while also being undesirable in other scenarios and/or environments. As such, most headsets that have ANC as a feature also have a mechanism for turning the ANC on or off, and that mechanism may be operated at the headset itself and/or by a mobile device that communicates with the headset. This mechanism generally allows an individual to manually turn on and adjust the ANC when desired and turn off the ANC when it is not desired.

BRIEF DESCRIPTION OF THE DRAWINGS

Implementations of techniques for ending audio playback based on a trigger word, presenting relevant audio data, and ending active noise cancellation based on a detected audio source are described with reference to the following Figures. The same numbers may be used throughout to reference like features and components shown in the Figures.

FIG. 4 is a flowchart illustrating an example of ending audio playback based on a trigger word in accordance with one or more implementations as described herein.

FIG. 9 illustrates an example method for ending audio playback based on a trigger word in accordance with one or more implementations of the techniques described herein.

FIG. 10 illustrates an example method for presenting relevant audio data in accordance with one or more implementations of the techniques described herein.

FIG. 11 illustrates an example method for ending active noise cancellation based on a detected audio source in accordance with one or more implementations of the techniques described herein.

DETAILED DESCRIPTION

Figure 1:
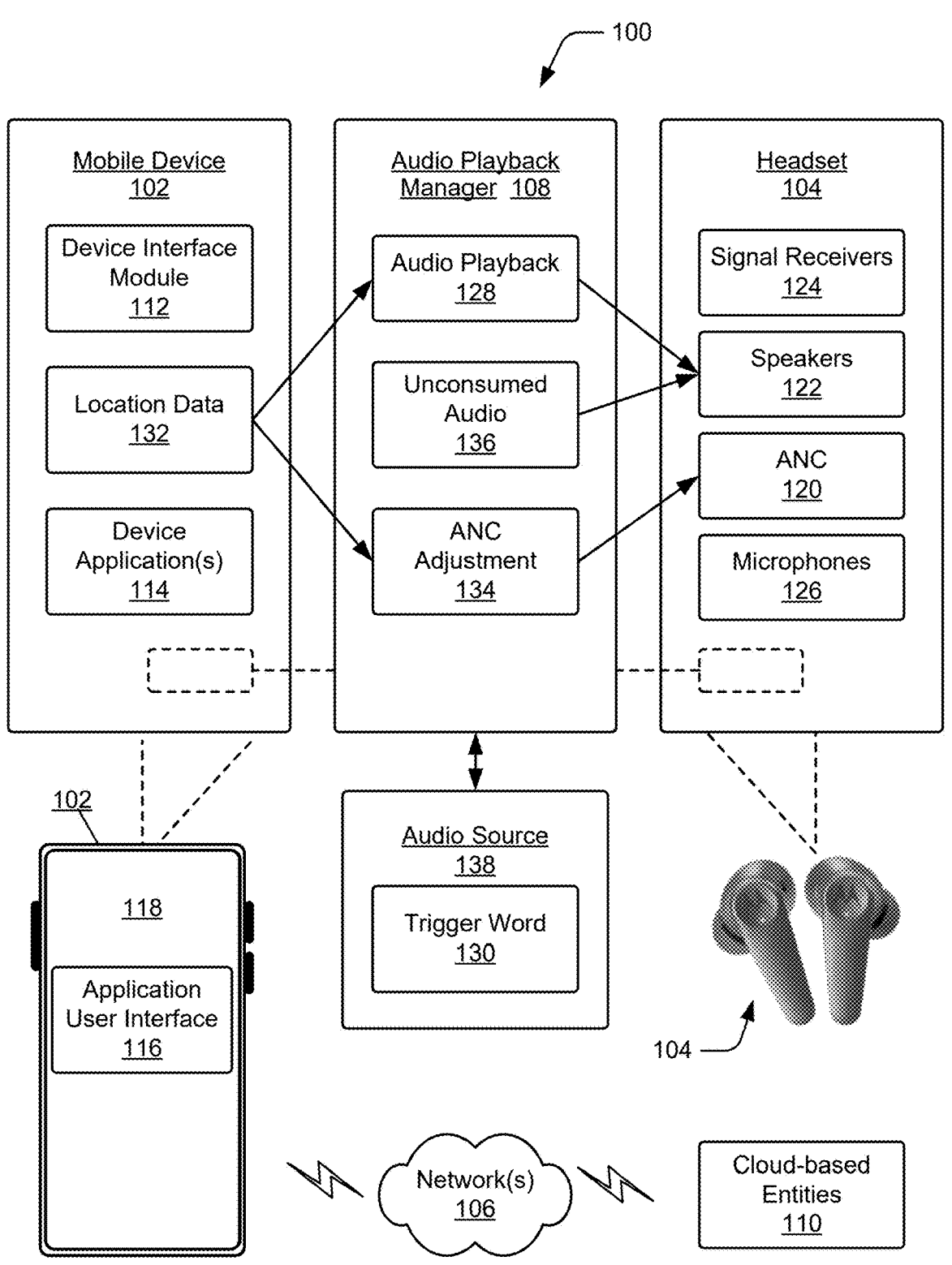
FIG. 1 illustrates an example system for ending audio playback based on a trigger word, including presenting relevant audio data and ending active noise cancellation based on a detected audio source in accordance with one or more implementations as described herein.

Implementations of the techniques for ending audio playback based on a trigger word, as well as presenting relevant audio data and ending active noise cancellation based on a detected audio source may be implemented as described herein. A mobile device, such as any type of a wireless device, media device, mobile phone, flip phone, client device, tablet, computing, communication, entertainment, gaming, media playback, and/or any other type of computing and/or electronic device, or a system of any combination of such devices, may be configured to perform techniques for ending audio playback based on a trigger word, presenting relevant audio data, and/or ending active noise cancellation based on a detected audio source as described herein. In one or more implementations, a mobile device includes an audio playback manager, which can be used to implement aspects of the techniques described herein.

Mobile devices allow users to listen to and interact with a variety of media involving audio feedback, including music, podcasts, videos, news, audiobooks, or other audible media. Headsets can connect (e.g., wired or wirelessly) and communicate with a mobile device to allow a user listening to the audio media without interrupting others and while maintaining privacy in public spaces. Many headsets are capable of active noise cancellation (ANC), which limits the amount of ambient noise heard by a user of a headset, and in turn, allows the user to better hear the audible media or other sounds from the headset. However, while ANC is generally a desirable feature of a headset, ANC presents some disadvantages. For example, a user wearing a headset that is actively causing ANC may not be able to hear others speaking to them. This is also a problem because the person speaking may not realize that the user cannot hear them, and the user may therefore miss important information. Conventional solutions involve a mechanism for adjusting the ANC, which generally allows the user to manually actuate the ANC when desired and turn off the ANC when it is not desired. However, this conventional solution is inconvenient because the user must manually adjust, turn on, or turn off the ANC, in addition to separately adjusting a volume of any audio playback from the headset. Additionally, the user may not even be aware that they are being spoken to and not know to manually adjust the ANC.

Techniques and systems are described for ending audio playback based on a trigger word, as well as presenting relevant audio data and ending active noise cancellation based on a detected audio source that overcome these limitations. In aspects of the described techniques, an audio playback manager is implemented in a mobile device, in a headset, or in a combination of both. The audio playback manager detects that the mobile device is communicating audio playback to the headset and/or that the headset is actively causing ANC. For example, the headset may be actively playing music communicated from the mobile device while also causing ANC, which limits the amount of external noise heard by a user wearing the headset.

Because the user wearing the headset cannot hear external noise, such as another person speaking, while audio feedback is playing and/or the ANC is active, the audio playback manager is configured to pause the audio feedback and/or adjust the ANC in response to detecting external audio that is relevant to the user. To determine whether external audio is relevant to the user, the audio playback manager detects that a trigger word is audible in an environment of the mobile device, such as a name of the user of the mobile device. The audio playback manager can therefore determine to pause the audio playback and/or adjust the ANC due to detecting the trigger word. The trigger word may be different depending on a location. For example, the user may answer to a formal name at work but a nickname at home. For this reason, the audio playback manager may additionally receive location data from the mobile device and determine a location of the mobile device. Based on the location of the mobile device, the audio playback manager determines which trigger word is applicable in a given environment.

The audio playback manager can also perform operations including presenting relevant audio data. In some situations, the person trying to speak to the user who is wearing a headset may not begin the conversation using a trigger word. For example, the other person begins talking to the user, realizes the user cannot hear them, and then says the trigger word. For this reason, the user misses the portion of the audio preceding the trigger word, which is unconsumed audio. To address this problem, the audio playback manager retains a recorded buffer of audio preceding the trigger word, including the unconsumed audio, and determines whether a portion of the audio preceding the trigger word is relevant to the user of the mobile device. The unconsumed audio, for example, is audio that the user was unable to hear because of the audio playback or the ANC obscured or cancelled out the audio. To determine whether the unconsumed audio is relevant to the user, the audio playback manager may leverage a machine learning model trained using previous user communications. The audio playback manager then presents the unconsumed audio to the user. If the audio playback manager determines that the user is viewing the display device of the mobile device, the audio playback manager generates a transcript of the unconsumed audio for display in the application user interface. However, if the audio playback manager determines that the user is not viewing the display device of the mobile device, the audio playback manager can generate a recording for playback via speakers of the headset. This allows the user to read or listen to the unconsumed audio, of which the user would have otherwise not been aware.

The audio playback manager also performs operations including ending active noise cancellation based on a detected audio source. In some situations, for instance, the user may not wish to be disturbed by specific people or entities, even if the trigger word is detected. To avoid interrupting the ANC when the user does not wish to be disturbed, the audio playback manager receives a selection of at least one audio source that triggers the ANC adjustment. For example, the audio playback manager may be manually configured to trigger the ANC adjustment when the user's spouse or boss is talking to the user. In other examples, the audio playback manager may leverage the machine learning model to determine the selection of an audio source that triggers the ANC adjustment without direct user involvement, such as based on perceived importance of relationships. Once the audio playback manager detects a sound originating from an audio source that triggers the ANC adjustment, the audio playback manager causes the ANC adjustment based on the detection. The audio playback manager therefore filters which audio is allowed to disturb the user by triggering the ANC adjustment based on the audio source.

The described techniques for ending audio playback based on a trigger word, presenting relevant audio data, and ending active noise cancellation based on a detected audio source overcome the limitations of conventional systems. For example, detecting a trigger word audible in an environment of the mobile device and subsequently pausing audio playback and/or adjusting ANC of the headset alleviates user frustration by minimizing the need for manual audio playback and/or ANC adjustments using conventional systems that involve an adjustment mechanism. Additionally, presenting relevant audio data allows the user to read an unconsumed audio transcript or listen to an unconsumed audio recording of relevant audio directed toward the user before a detected trigger word was spoken. This reduces the chance that the user will miss important information while wearing the headset, unlike conventional systems. Ending active noise cancellation based on a detected audio source also ensures that the user is only interrupted by a selection of at least one audio source that triggers the ANC adjustment, thereby eliminating unwanted distractions.

While features and concepts of the described techniques for ending audio playback based on a trigger word, presenting relevant audio data, and ending active noise cancellation based on a detected audio source is implemented in any number of different devices, systems, environments, and/or configurations, implementations of the techniques for ending audio playback based on a trigger word, presenting relevant audio data, and ending active noise cancellation based on a detected audio source are described in the context of the following example devices, systems, and methods.

FIG. 1 illustrates an example system 100 for ending audio playback based on a trigger word, including presenting relevant audio data and ending active noise cancellation based on a detected audio source, as described herein. The system 100 includes a mobile device 102, a headset 104, a communication network 106, and an audio playback manager 108. Examples of the mobile device 102 include any type of a wireless device, mobile device, mobile phone, flip phone, client device, companion device, tablet, computing device, communication device, entertainment device, gaming device, media playback device, any other type of computing, consumer, and/or electronic device. Examples of the headset 104 can include over-the-ear headphones, earbuds, ear pods, an earpiece, and/or any other type of headset having or implemented with the ANC feature. Additionally, the headset 104 may be wired or wireless.

The mobile device 102 can be implemented with various components, such as a processor system and memory, as well as any number and combination of different components as further described with reference to the example device shown in FIG. 12. In implementations, the mobile device 102 includes various radios for wireless communication with other devices. For example, the system and devices can include a Bluetooth (BT) and/or Bluetooth Low Energy (BLE) transceiver, as well as a near field communication (NFC) transceiver. In some cases, the system and devices include at least one of a WiFi radio, a cellular radio, a global positioning satellite (GPS) radio, or any available type of device communication interface.

In some example implementations, the devices, applications, modules, servers, and/or services described herein communicate via the communication network 106, such as for data communication between the mobile device 102 and various cloud-based entities 110, such as devices, services, servers, and/or systems in the network cloud. The communication network 106 can include a wired and/or a wireless network. The communication network 106 is implemented using any type of network topology and/or communication protocol and is represented or otherwise implemented as a combination of two or more networks, to include IP-based networks, cellular networks, and/or the Internet. The communication network 106 can include mobile operator networks that are managed by a mobile network operator and/or other network operators, such as a communication service provider, mobile phone provider, and/or Internet service provider.

The mobile device 102 includes various functionality that enables the device to implement different aspects of ending audio playback based on a trigger word, presenting relevant audio data, and ending active noise cancellation based on a detected audio source, as described herein. In one or more examples, an interface module 112 represents functionality (e.g., logic and/or hardware) enabling the mobile device 102 to interconnect and interface with other devices and/or networks, such as the communication network 106. For example, the interface module 112 enables wireless and/or wired connectivity of the mobile device 102. The interface module 112 represents functionality enabling the mobile device 102 to interface with other devices and/or applications of the mobile device 102, and the interface module 112 can include one or more device settings and/or device configurations of the mobile device.

The mobile device 102 can include and implement various device applications, such as any type of messaging application, email application, video communication application, cellular communication application, music/audio application, gaming application, media application, social platform applications, and/or any other of the many possible types of various device applications. Many of the device applications 114 have an associated application user interface 116 that is generated and displayed for user interaction and viewing, such as on a display device 118 of the mobile device 102. Generally, an application user interface, or any other type of video, image, graphic, graphical code and the like is digital image content that is displayable on the display of the mobile device 102.

Similar to the mobile device 102, the headset 104 also includes various functionalities that enable the headset to implement different aspects of ending audio playback based on a trigger word, presenting relevant audio data, and ending active noise cancellation based on a detected audio source, as described herein. In the illustrated example, the headset 104 is configured to cause active noise cancellation (ANC) 120 (e.g., implemented as a feature, module, software, firmware, and/or the like) and includes one or more speakers 122, one or more signal receivers 124, and one or more microphones 126. The ANC 120 can be implemented with any of a variety of ANC technologies. Typically, the ANC 120 causes the headset 104 to emit sound waves that are opposite to the ambient noise, thereby cancelling at least a portion of the ambient noise. For more sophisticated ANC, the one or more microphones 126 receive the ambient noise to aid in producing sound waves that are opposite to the ambient noise. The one or more speakers 122 can be any of a variety of speakers suitable for use in the headset 104, such as dynamic drivers. The signal receiver 124 can be a wireless and/or Bluetooth receiver and/or can be a receiver for a wired connection. As such, the headset 104 can be a wired headset or a wireless headset, and implemented for audio communication with the mobile device 102. In a typical scenario, the headset 104 receives signals from the mobile device 102 and produces sound from the one or more speakers 122. At the same time, when activated, the ANC 120 would cause the one or more speakers 122 to send out sounds waves for cancelling ambient noise.

In the example system 100 for ending audio playback based on a trigger word, presenting relevant audio data, and ending active noise cancellation based on a detected audio source, the mobile device 102 and/or the headset 104 implements the audio playback manager 108 (e.g., as a device application). As shown in this example, the audio playback manager 108 represents functionality (e.g., logic, software, and/or hardware) enabling aspects of the described techniques for ending audio playback based on a trigger word, presenting relevant audio data, and ending active noise cancellation based on a detected audio source. The audio playback manager 108 can be implemented as computer instructions stored on computer-readable storage media and can be executed by a processor system of the mobile device 102. Alternatively, or in addition, the audio playback manager 108 can be implemented at least partially in hardware of the device.

In one or more implementations, the audio playback manager 108 includes independent processing, memory, and/or logic components functioning as a computing and/or electronic device integrated with the mobile device 102. Alternatively, or in addition, the audio playback manager 108 can be implemented in software, in hardware, or as a combination of software and hardware components. In this example, the audio playback manager 108 is implemented as a software application or module, such as executable software instructions (e.g., computer-executable instructions) that are executable with a processor system of the mobile device 102 to implement the techniques and features described herein. As a software application or module, the audio playback manager 108 can be stored on computer-readable storage memory (e.g., memory of a device), or in any other suitable memory device or electronic data storage implemented with the controller. Alternatively or in addition, the audio playback manager 108 is implemented in firmware and/or at least partially in computer hardware. For example, at least part of the audio playback manager 108 is executable by a computer processor, and/or at least part of the content manager is implemented in logic circuitry. In at least one implementation the audio playback manager 108 can be implemented as part of and/or in conjunction with an operating system of the mobile device 102 and/or the headset 104.

In this example system 100, the audio playback manager 108 performs operations for ending audio playback based on a trigger word by first detecting that the headset 104 is in communication with the mobile device 102. The headset 104 may be causing ANC and outputting audio playback 128 communicated from the mobile device 102. For example, the audio playback 128 may include music, a podcast, or any other audible media the user may be listening to via the headset 104. The ANC 120 cancels ambient noise in the environment, so the user is likely unable to hear external noise, other than the audio playback 128.

Because the combination of the audio playback 128 and the ANC 120 prevents the user from hearing external audio in the environment, the audio playback manager 108 determines what external audio is relevant to the user to initiate interruption of the audio playback 128 and the ANC 120 so that the user may hear the external audio. To do this, the audio playback manager 108 detects that a trigger word 130 is audible in an environment of the mobile device 102, such as a name of the user of the mobile device 102. For example, a person may say the user's name, trying to get the attention of the user, who is enjoying the audio playback 128 via the headset 104 and unaware of the other person due to the ANC 120. The audio playback manager 108 therefore determines to interrupt the audio playback 128 and the ANC 120 due to the trigger word 130. The trigger word 130 may be different depending on a location. For example, the user may answer to a formal name at work but a nickname at home. For this reason, the audio playback manager 108 receives location data 132 from the mobile device 102 and determines a location of the mobile device 102. Based on the location of the mobile device 102, the audio playback manager 108 determines which trigger word 130 is applicable.

In response to detecting the trigger word 130, the audio playback manager 108 ends the audio playback 128 and causes an ANC adjustment 134 of the headset 104 in response to detecting the trigger word 130. The ANC adjustment 134, for instance, may involve pausing the ANC 120, ending the ANC 120, or lowering a level of the ANC 120. For example, the audio playback manager 108 detects that the user's name is spoken, pauses music the user is listening to, and decreases the ANC 120 so that the user can hear what the other person is trying to tell them.

In an additional example implementation, the audio playback manager 108 also performs operations including presenting relevant audio data. In some situations, a person trying to speak to a user who is wearing a headset listening to the audio playback 128 and/or with the ANC 120 may not begin a conversation using a trigger word 130. For example, the other person begins talking to the user, realizes the user cannot hear them, and then says the trigger word 130. For this reason, the user wearing the headset misses the portion of the audio preceding the trigger word 130. To address this problem, the audio playback manager 108 begins in this example by monitoring the audio in the environment for the trigger word 130. For example, the audio playback manager 108 detects a trigger word 130 spoken by the other person via the one or more microphones 126 associated with the mobile device 102 or the headset 104.

The audio playback manager 108 can then determine whether a portion of the audio preceding the trigger word 130 is relevant to the user of the mobile device 102, and the previous audio is unconsumed audio 136. The unconsumed audio 136, for example, is audio that the user who is wearing the headset was unable to hear because of the audio playback 128 and/or the ANC 120 obscured or cancelled out the audio. To determine whether the unconsumed audio 136 is relevant to the user, the audio playback manager 108 may leverage a machine learning model trained using previous user communications. For example, the machine learning model is capable of determining whether the unconsumed audio 136 was speech directed at the user, or if the unconsumed audio 136 was general speech not directed at the user, such as a person singing or talking to somebody else before saying the trigger word 130.

The audio playback manager 108 then presents the unconsumed audio 136 to the user. If the audio playback manager 108 determines that the user is likely viewing the display device 118 of the mobile device 102, then the audio playback manager 108 can generate a transcript of the unconsumed audio 136 for display in the application user interface 116. If the audio playback manager 108 determines that the user is likely not viewing the display device 118 of the mobile device 102, however, then the audio playback manager 108 can generate a recording for playback via the one or more speakers 122 of the headset 104. This allows the user to read or listen to the unconsumed audio 136, of which the user would have otherwise not been aware.

Additionally, in one or more example implementations, the audio playback manager 108 can also perform operations including ending active noise cancellation based on a detected audio source. In some additional situations, for instance, the user wearing the headset may not wish to be disturbed by specific people or entities, even if a trigger word 130 is detected. To facilitate these preferences, the audio playback manager 108 detects the headset 104 employing ANC 120 of audio in communication with the mobile device 102 in the environment.

The audio playback manager 108 may receive a selection of at least one audio source that triggers the ANC adjustment 134. For example, the audio playback manager 108 may be manually configured to trigger the ANC adjustment 134 when a particular person (e.g., the user's spouse or boss) is detected as talking to the user. In other example, the audio playback manager 108 may leverage the machine learning model to determine the selection of an audio source that triggers the ANC adjustment 134 without direct user involvement, such as based on perceived importance of relationships or relevance, or based on a detected conversation. Once the audio playback manager 108 detects a sound originating from an audio source 138 that triggers the ANC adjustment 134, the audio playback manager 108 can cause the ANC adjustment 134 based on the detection. The audio playback manager 108 therefore filters which audio is allowed to disturb or interrupt the user by triggering the ANC adjustment 134 based on a context of the audio source 138.

In one or more implementations, the audio playback manager 108 can be implemented with, or to use or leverage, a machine learning (ML) model or algorithm (e.g., a neural network, artificial intelligence (AI) algorithms). The audio playback manager 108 implemented as a machine learning model may include AI, a ML model or algorithm, a convolutional neural network (CNN), and/or any other type of machine learning model to implement features of ending audio playback based on a trigger word, presenting relevant audio data, and/or ending active noise cancellation based on a detected audio source. As used herein, the term "machine learning model" refers to a computer representation that is trainable based on inputs to approximate unknown functions. For example, a machine learning model can utilize algorithms to learn from, and make predictions on, inputs of known data (e.g., training and/or reference images) by analyzing the known data to learn to generate outputs. In the example system 100, the audio playback manager 108 can determine the trigger word 130, the unconsumed audio 136, and/or the selection of the at least one audio source that triggers the ANC adjustment 134 to support features of ending audio playback based on a trigger word, presenting relevant audio data, and/or ending active noise cancellation based on a detected audio source.

Figure 2:
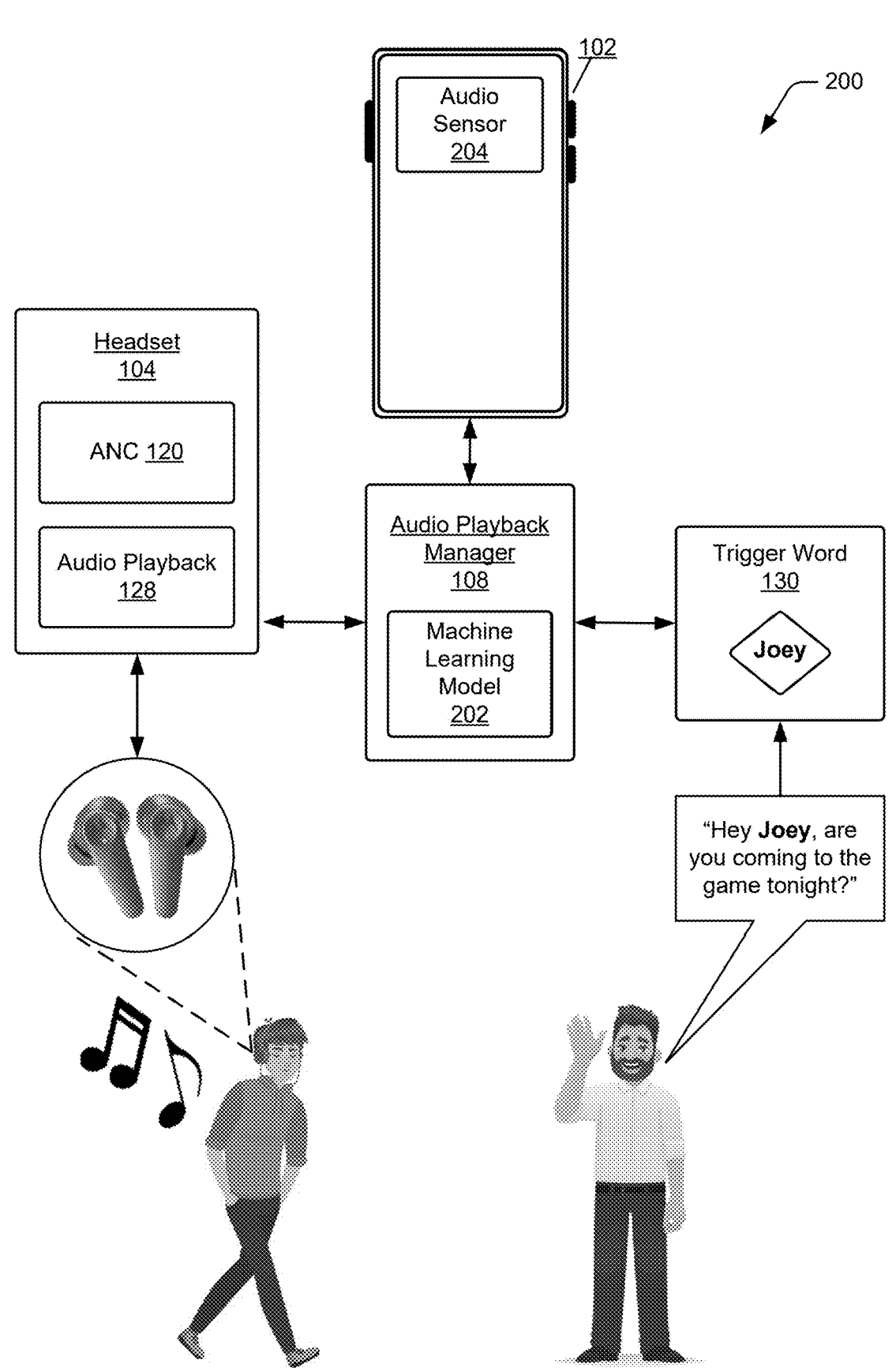
FIGS. 2 and 3 further illustrate examples of ending audio playback based on a trigger word in accordance with one or more implementations as described herein.

FIG. 2 illustrates an example 200 of ending audio playback based on a trigger word, as described herein. In this example 200, an audio playback manager 108 is implemented in a mobile device 102 and detects that audio playback 128 is communicated to a headset 104 from the mobile device 102. For example, the audio playback 128 in this example includes music that a user is listening to while wearing the headset 104. The audio playback 128 is not limited to music, however, and may include any other audible content, including a podcast, movie audio, a news broadcast, and so forth. Additionally or alternatively, the audio playback manager 108 detects that the headset 104 is actively causing active noise cancellation (ANC) 120 that cancels ambient noise in the environment, so the user is unable to hear external noise.

Because the combination of the audio playback 128 and the ANC 120 prevents the user from hearing external audio in the environment, the audio playback manager 108 determines what external audio is relevant to the user to interrupt the audio playback 128 and the ANC 120 so that the user may hear the external audio. To do this, the audio playback manager 108 detects that a trigger word 130 is audible in an environment of the mobile device 102, such as a name of the user of the mobile device 102. In this example, the trigger word 130 is the user's name, "Joey." For example, the user is wearing the headset 104, which is playing music and is using the ANC 120. The user's friend says "Hey Joey, are you coming to the game tonight?" trying to get the attention of the user, who is unaware of the friend due to the ANC 120.

The audio playback manager 108 can therefore determine to interrupt the audio playback 128 and the ANC 120 after detecting the trigger word 130, which is "Joey." For example, after the audio playback manager 108 pauses the audio playback 128 and lowers a level of, or ends, the ANC 120 so that the user hears the audio spoken after the trigger word 130, which includes the dialog "are you coming to the game tonight?" In some example implementations, the audio playback manager 108 may wait for the conversation to end or wait for a predetermined threshold amount of time before resuming the audio playback 128 and/or the ANC 120.

To determine the trigger word 130, in one or more implementations, the audio playback manager 108 may leverage a machine learning model 202 to learn words, phrases, or other sounds that are determined to capture attention of the user. A trigger word 130, for instance, may be any single word or combination of multiple words that indicate a conversation is directed at the user. The machine learning model 202 may determine the trigger word 130 through observation of user interaction with the mobile device 102. For example, the machine learning model may learn from text messages, emails, phone calls, social media, or recorded audio conversations to determine the trigger word 130.

In one or more implementations, the mobile device 102 and/or the headset 104 includes (or communicates with) an audio sensor 204 for monitoring the audio in the environment. The mobile device 102 and/or the headset 104 can include a microphone used as the audio sensor 204. Additionally or alternatively, the audio sensor 204 may be a microphone within a watch or other device that is in communication with the mobile device 102 and/or with the headset 104, or a different or alternative microphone. It is further contemplated that one or more alternative audio sensors can be included as part of the audio sensor 204, or the audio sensor can include any combination of the aforementioned audio sensors.

Figure 3:
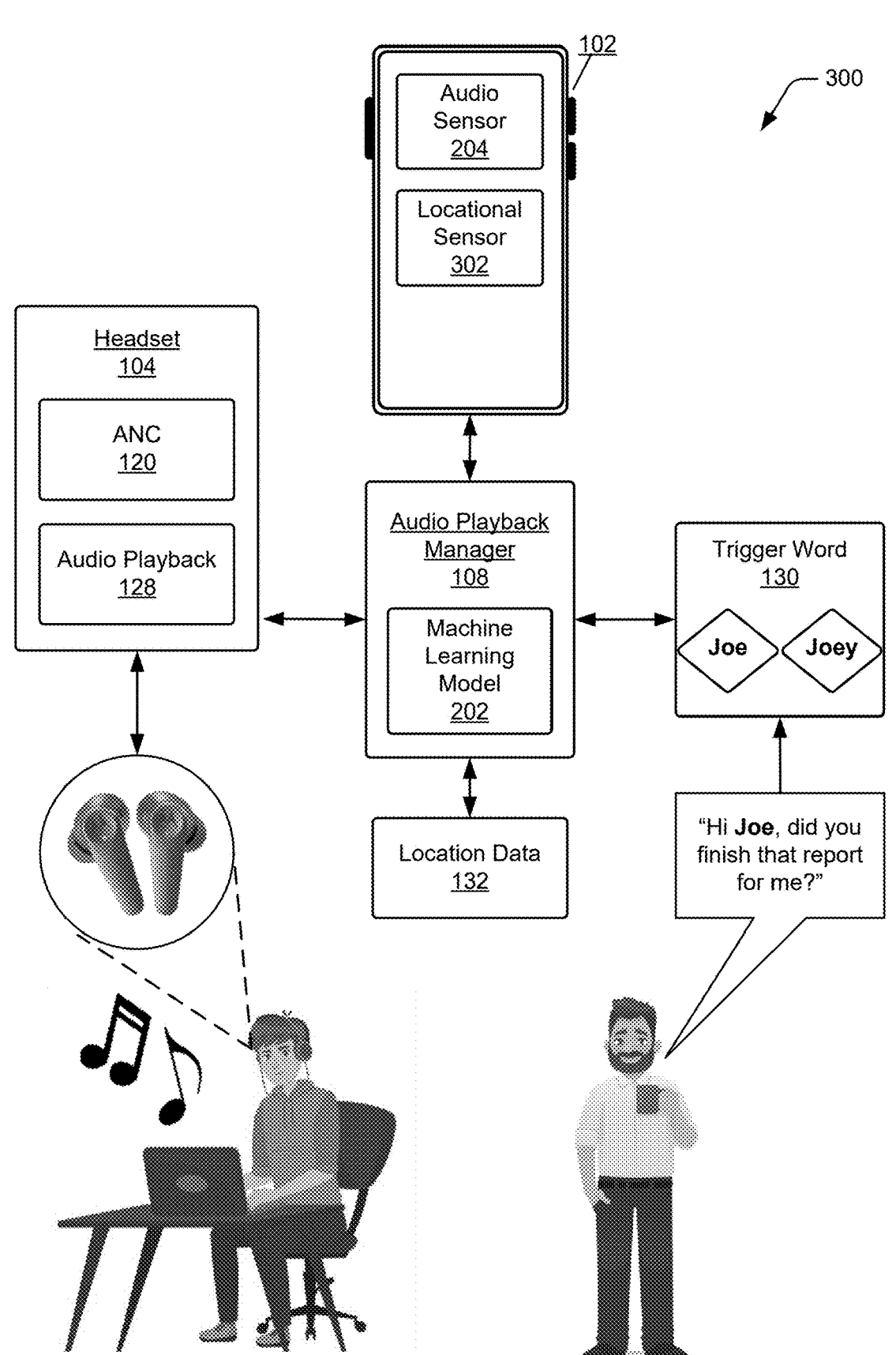

FIG. 3 illustrates an example 300 of ending audio playback based on a trigger word, as described herein. The example 300 is a continuation of the example 200 described with respect to FIG. 2. In this example 300, the audio playback manager 108 can detect that the audio playback 128 is communicated to the headset 104 from the mobile device 102. For example, the audio playback 128 in this example includes music that the user is listening to while wearing the headset 104, and the headset 104 is actively causing the ANC 120 that cancels ambient noise in the environment, so the user is unable to hear external noise.

Because the combination of the audio playback 128 and the ANC 120 prevents the user from hearing external audio in the environment, the audio playback manager 108 determines what external audio is relevant to the user to initiate interruption of the audio playback 128 and the ANC 120 so that the user may hear the external audio. To do this, the audio playback manager 108 can detect that a trigger word 130 is audible in an environment of the mobile device 102, such as a name of the user of the mobile device 102.

However, the trigger word 130 may be different depending on a location. For example, the user may answer to a formal name at work, but answer to a nickname at home. For this reason, in one or more implementations, the mobile device 102 and/or the headset 104 includes (or communicates with) a locational sensor for monitoring location data 132 related to the mobile device 102 or the headset 104. The mobile device 102 can include a global positioning system (GPS) that is used as the locational sensor. Additionally or alternatively, the locational sensor can include a GPS separate from mobile device 102, but in communication with the mobile device 102. The audio playback manager 108 therefore receives the location data 132 from the mobile device 102 and determines a location of the mobile device 102. Based on the location of the mobile device 102, the audio playback manager 108 determines which trigger word 130 is applicable.

In the example 200 described above, the trigger word is "Joey" because the mobile device 102 is located in a casual setting, such as such as when the user is at home or school. However, in this example 300, the trigger word 130 is "Joe" because the mobile device 102 is located at the user's office, which is a more formal setting for the user. Therefore, the audio playback manager 108 determines that the user answers to the name "Joe" at the office. In this example, the user is wearing the headset 104, which is playing music and is using the ANC 120. The user's coworker says "Hi Joe, did you finish that report for me?" trying to get the attention of the user, who is unaware of the coworker due to the ANC 120.

The audio playback manager 108 can therefore determine to interrupt the audio playback 128 and the ANC 120 after detecting the trigger word 130, which is "Joe." For example, after the audio playback manager 108 pauses the audio playback 128 and lowers a level of, or ends, the ANC 120 or ends the ANC 120 so that the user hears audio proceeding the trigger word 130, which includes the dialog "did you finish that report for me?"

To determine the trigger word 130 based on the location, in one or more implementations, the audio playback manager 108 can leverage the machine learning model 202 to learn words, phrases, or other sounds that are determined to capture attention of the user depending on where the user is located based on the location data 132 corresponding to the mobile device 102. The machine learning model 202 may determine the trigger word 130 through observation of user interaction with the mobile device 102. For example, the machine learning model may learn from text messages, emails, phone calls, social media, or recorded audio conversations to determine the trigger word 130 based on the location data 132 corresponding to the mobile device 102.

FIG. 4 illustrates a flowchart illustrating an example method 400 of ending audio playback based on a trigger word, as described herein. In this example at 402, audio in an environment of a mobile device 102 is monitored for determining, at 404, if a trigger word 130 is detected. The mobile device 102, for example communicates audio playback 128 to a headset 104, which implements active noise cancellation (ANC). If no trigger word 130 is detected, then the mobile device 102 and/or the headset 104 (e.g., the audio playback manager 108) continue to monitor the audio for the trigger word 130. If the trigger word 130 is detected at 404, then the mobile device 102 determines, at 406, if the trigger word 130 corresponds to a location of the mobile device 102. If the trigger word 130 does not correspond to the location of the mobile device 102, then the mobile device 102 and/or the headset 104 return to monitor the audio for the trigger word 130. If the trigger word 130 does correspond to the location of the mobile device 102 at 406, then at 408, the mobile device 102 and/or the headset 104 ends the audio playback 128. Additionally or alternatively, if the trigger word 130 does correspond to the location of the mobile device 102, then at 410, the mobile device 102 and/or the headset 104 adjusts the ANC 120 of the headset 104.

Figure 5:
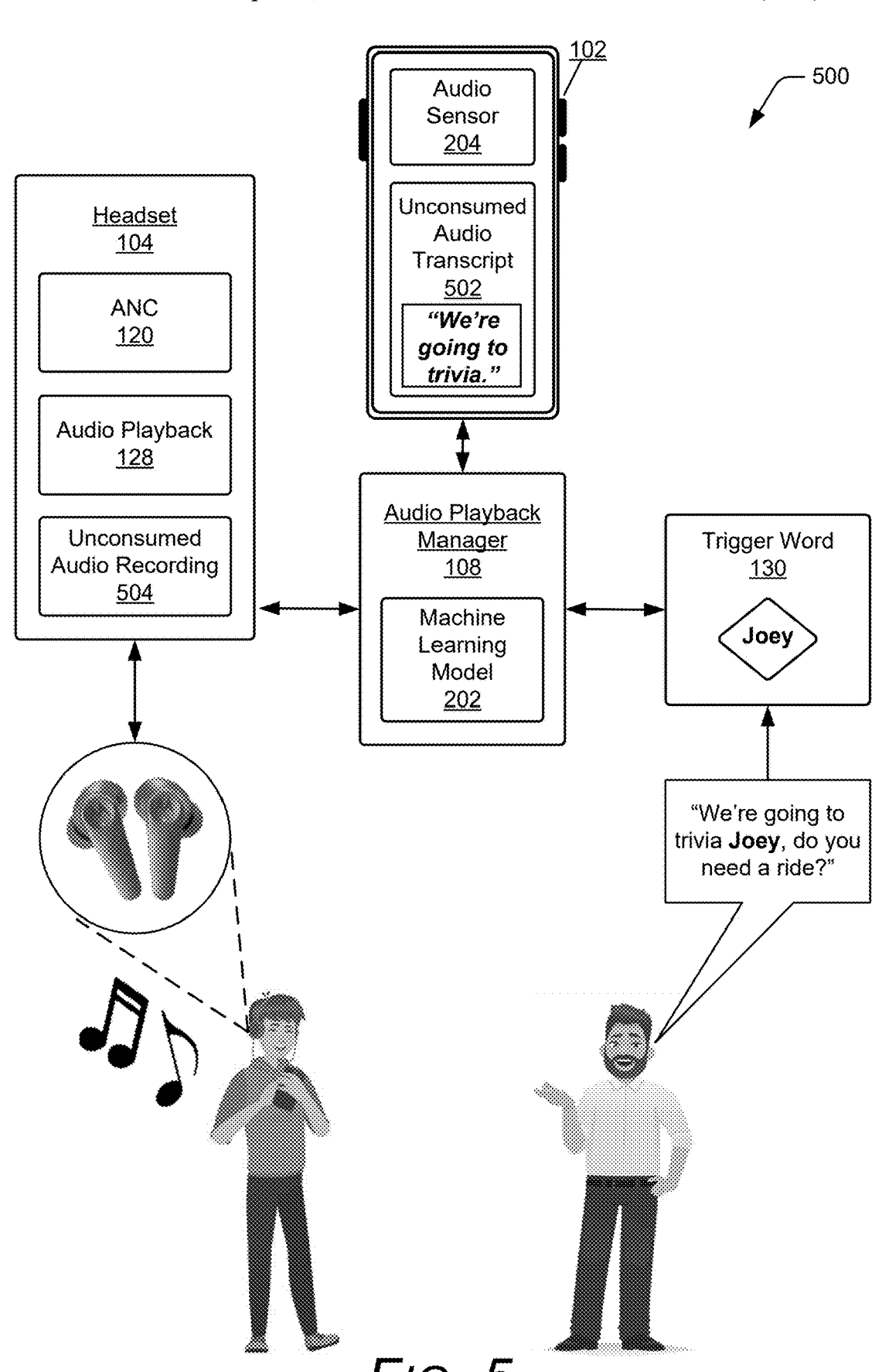
FIG. 5 further illustrates an example of presenting relevant audio data in accordance with one or more implementations as described herein.

FIG. 5 illustrates an example 500 of presenting relevant audio data, as described herein. In this example 500, an audio playback manager 108 is implemented in a mobile device 102, which is in communication with a headset 104. For example, the mobile device 102 may communicate audio playback 128 to the headset 104, and the headset 104 is actively causing or utilizing the ANC 120 that cancels ambient noise in the environment, so the user is unable to hear external noise. As illustrated in this example, the audio playback 128 includes music that the user is listening to while wearing the headset 104.

Because the combination of the audio playback 128 and the ANC 120 prevents the user from hearing external audio in the environment, the audio playback manager 108 can determine what external audio is relevant to the user to interrupt the audio playback 128 and/or the ANC 120 so that the user may hear the external audio. To do this, the audio playback manager 108 detects that a trigger word 130 is audible in an environment of the mobile device 102, such as a name of the user of the mobile device 102.

However, in some situations, a person speaking to the user does not begin a conversation using a trigger word 130. As illustrated, the user's friend approaches the user, who is wearing the headset 104, which is playing audio playback 128 and causing the ANC 120 so that the user cannot hear external audio. The user's friend begins talking to the user, saying "We're going to trivia, Joey, do you need a ride?" As described in examples above, the audio playback manager 108 can detect the trigger word 130, which is "Joey," and subsequently pauses the audio playback 128 and/or adjusts the ANC 120 so that the user can hear the user's friend. However, because the user's friend initially said dialog, including "We're going to trivia" before saying the trigger word 130, the user missed the dialog preceding the trigger word 130 because the audio playback 128 was playing and the ANC 120 was active. The audio that precedes the trigger word 130, for instance, is unconsumed audio because the user was unable to hear the audio, even though the audio is relevant to the user.

To address this problem, the audio playback manager 108 can determine whether a portion of the audio preceding the trigger word 130 is relevant to the user of the mobile device 102, which is then unconsumed audio. The unconsumed audio, for example, is audio that the user was unable to hear because of the audio playback 128 or the ANC 120 obscured or cancelled out the audio. To determine whether the unconsumed audio is relevant to the user, the audio playback manager 108 records audio and stores a temporary recorded buffer of audio. After detecting the trigger word 130 for example, the audio playback manager 108 determines whether the temporary recorded buffer of audio includes the unconsumed audio that is recorded and relevant to the user. To do this, the audio playback manager 108 leverages a machine learning model 202 trained using previous user communications. For example, the machine learning model 202 is capable of determining whether the unconsumed audio was speech directed at the user, or if the unconsumed audio was general speech not directed at the user, such as a person singing or talking to somebody else before saying the trigger word 130.

The audio playback manager 108 then presents the unconsumed audio 136 to the user. If the audio playback manager 108 determines that the user is likely viewing the mobile device 102, the audio playback manager 108 generates an unconsumed audio transcript 502 for display on the application user interface 116 of the mobile device 102. In this example, the unconsumed audio transcript 502 includes the text "We're going to trivia . . . " for viewing on the mobile device 102 so that the user may read the unconsumed audio. If the audio playback manager 108 determines that the user is likely not viewing the mobile device 102, however, the audio playback manager 108 generates an unconsumed audio recording 504 for output via the one or more speakers 122 of the headset 104. In this example, the unconsumed audio recording 504 includes recorded dialog including "We're going to trivia" for listening on the mobile device 102 so that the user may hear the unconsumed audio. The audio playback manager 108 may additionally remove background audio from the unconsumed audio recording 504 so that the recorded dialog is clear.

In some example implementations, the audio playback manager 108 may resume the audio playback 128 and/or the ANC 120 after presenting the unconsumed audio transcript 502 or the unconsumed audio recording 504. Additionally or alternatively, the unconsumed audio transcript 502 and the unconsumed audio recording 504 may be presented simultaneously. For example, the user is able to read the unconsumed audio transcript 502 on the mobile device 102 while also listening to the unconsumed audio recording 504 via the headset 104. In some additional example implementations, the unconsumed audio transcript 502 and/or the unconsumed audio recording 504 are stored in a database for later access or presentation.

Figure 6:
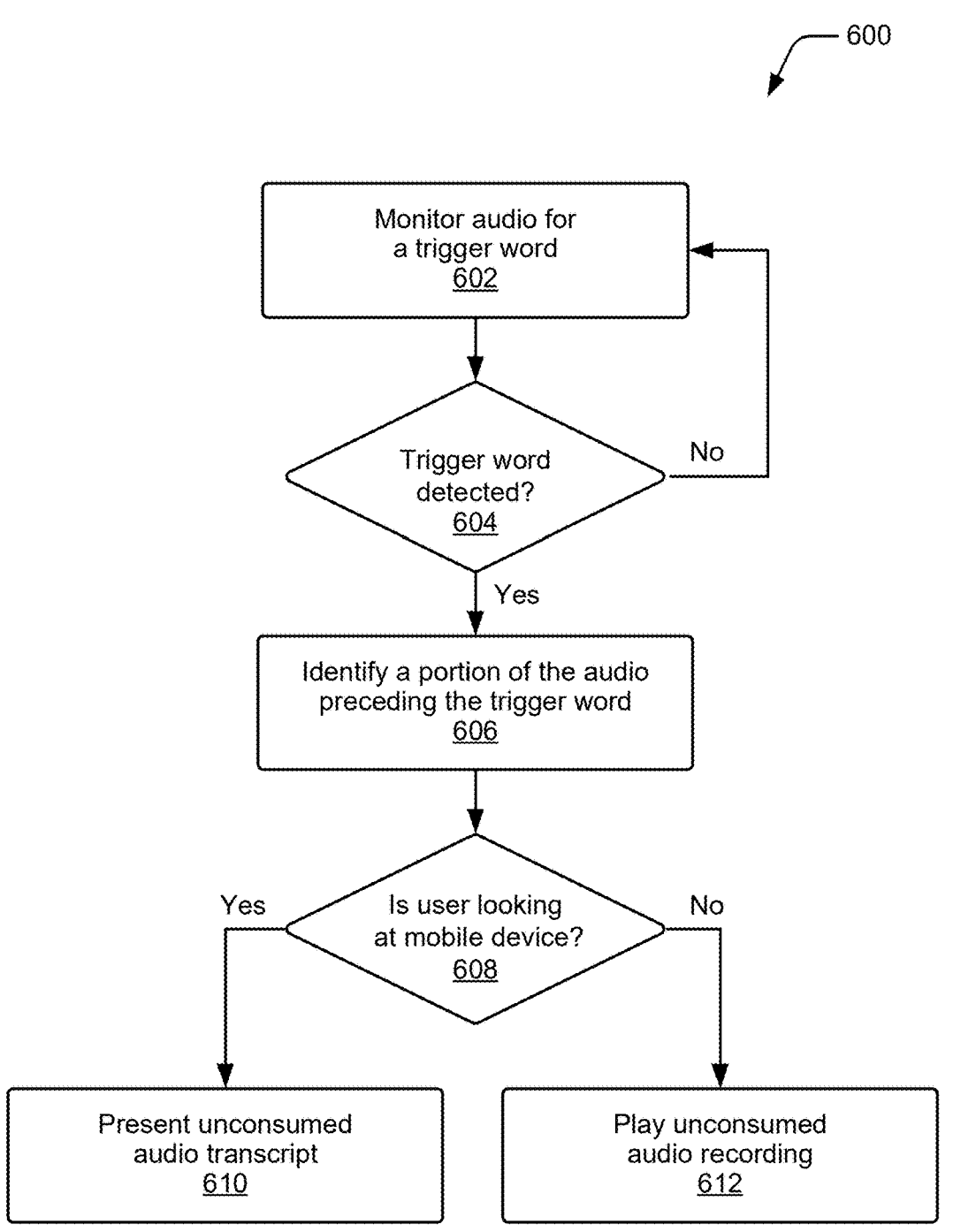
FIG. 6 is a flowchart illustrating an example of presenting relevant audio data in accordance with one or more implementations as described herein.

FIG. 6 is a flowchart illustrating an example method 600 of presenting relevant audio data, as described herein. In this example at 602, audio in an environment of a mobile device 102 is monitored for determining, at 604, if a trigger word 130 is detected. The mobile device 102, for example communicates audio playback 128 to a headset 104, which implements ANC. If no trigger word 130 is detected, then the mobile device 102 and/or the headset 104 (e.g., the audio playback manager 108) continue to monitor the audio for the trigger word 130. If the trigger word 130 is detected at 604, then the mobile device 102 identifies, at 606, a portion of the audio preceding the trigger word 130 for determining, at 608, if a user is looking at the mobile device 102. If the user is looking at the mobile device 102, then at 610, the mobile device 102 presents an unconsumed audio transcript 502 for display on the mobile device 102. If the user is not looking at the mobile device 102, then at 612, the mobile device 102 and/or the headset 104 plays an unconsumed audio recording 504.

Figure 7:
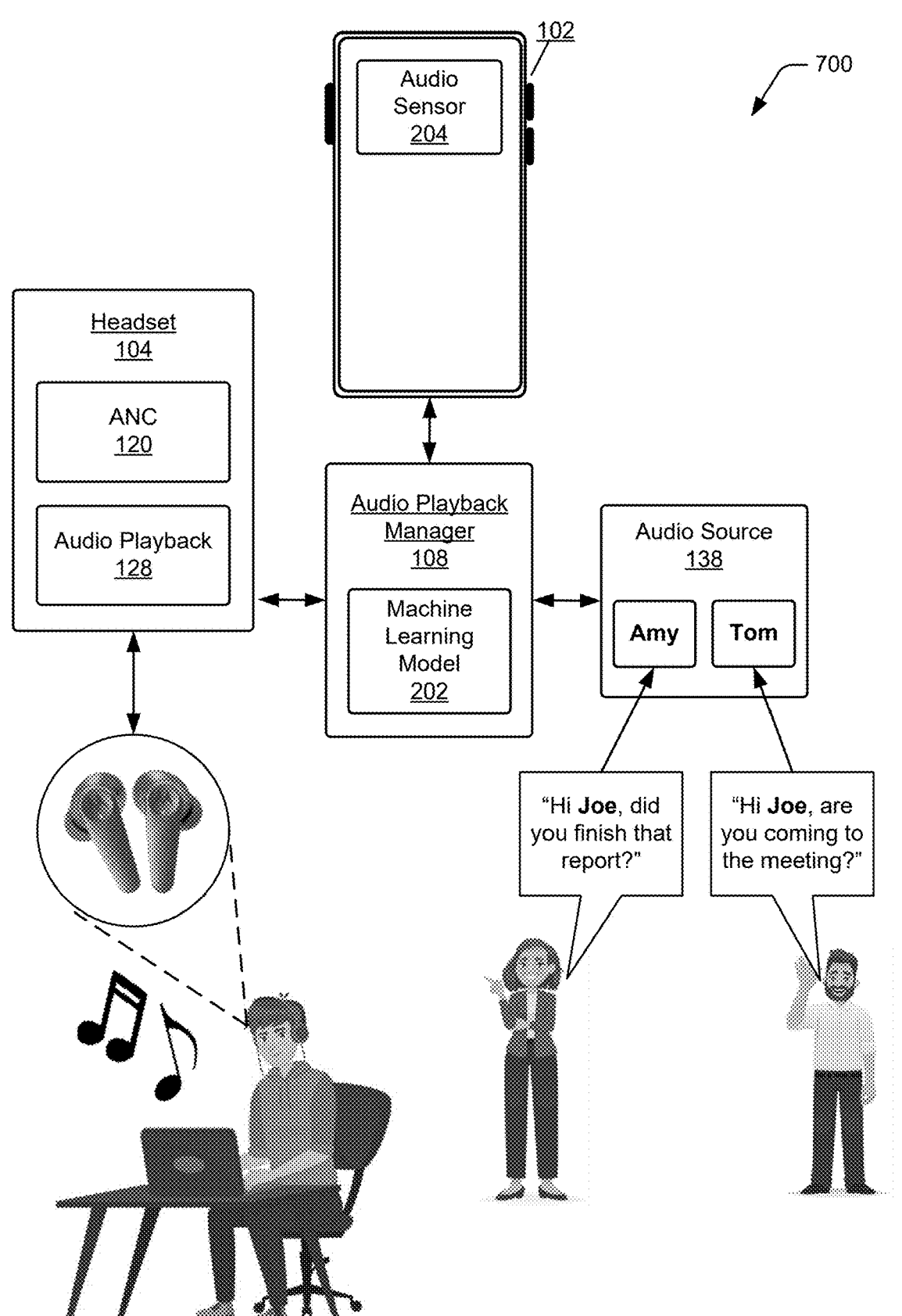
FIG. 7 further illustrates an example of ending active noise cancellation based on a detected audio source in accordance with one or more implementations as described herein.

FIG. 7 illustrates an example 700 of ending active noise cancellation based on a detected audio source, as described herein. In this example 700, the audio playback manager 108 is implemented in the mobile device 102, which is in communication with the headset 104. For example, the mobile device 102 may communicate audio playback 128 to the headset 104, and the headset 104 is actively causing or utilizing the ANC 120 that cancels ambient noise in the environment, so the user is unable to hear external noise. As illustrated in this example, the audio playback 128 includes music that the user is listening to while wearing the headset 104.

Because the combination of the audio playback 128 and the ANC 120 prevents the user from hearing external audio in the environment, the audio playback manager 108 can determine what external audio is relevant to the user to initiate interruption of the audio playback 128 and/or the ANC 120 so that the user may hear the external audio. To do this, the audio playback manager 108 detects that a trigger word 130 is audible in an environment of the mobile device 102, such as a name of the user of the mobile device 102.

However, in some situations, the user does not want to be bothered every time the trigger word 130 is spoken. For example, the user may be working on a project and does not want to be interrupted by coworkers, but needs to be available to be interrupted by their boss. To address this problem, the audio playback manager 108 can receive a selection of at least one audio source 138 that triggers adjustment of the ANC 120 and/or the audio playback 128. For example, the selection of an audio source 138 may include a list of people or other entities that are approved to disturb the user by triggering adjustment of the ANC 120 and/or the audio playback 128. The list, for example, may include identifiers of specific people or classes of people, such as based on job position or familial relation to the user. In some example implementations, the selection of the audio source 138 is manually determined by a user. For example, the user selects people or entities that are approved to disturb the user by triggering adjustment of the ANC 120 and/or the audio playback 128.

In other examples, the selection of an audio source 138 is automatically determined by the machine learning model 202. The machine learning model 202 may be trained on prior user interactions to determine which people or entities are approved to disturb the user by triggering adjustment of the ANC 120 and/or the audio playback 128. For example, the machine learning model 202 may learn from prior text messages, emails, social media interactions, recorded audio, call time, and positioning information to determine specific people or classes of people that the user intends to interact with and then generates the selection of the audio source 138 accordingly.

In this example, the user is wearing the headset 104, which is actively causing the ANC 120 and playing the audio playback 128 communicated from the mobile device 102. The user's coworker, Tom, is trying to get the user's attention by saying "Hi Joe, are you coming to the meeting." Although "Joe" is a trigger word 130 that would otherwise pause the ANC 120 and end the audio playback 128 for the user, Tom is not included in the indicated audio source 138 that triggers adjustment of the ANC 120 and/or the audio playback 128. Later, the user's boss, Amy, is trying to get the user's attention by saying "Hi Joe, did you finish that report?" Unlike Tom, Amy is included in the indicated audio source 138 that triggers adjustment of the ANC 120 and/or the audio playback 128. For this reason, the audio playback manager 108 detects that Amy is speaking using an audio sensor 204 implemented in the mobile device 102 and/or in the headset 104 and consequently adjusts the ANC 120 by lowering a level of the ANC 120 and/or ends the audio playback 128 so that the user can hear Amy speaking.

Although this example contemplates the audio source 138 that triggers adjustment of the ANC 120 and/or the audio playback 128, other example implementations additionally or alternatively include a list of at least one audio source that does not trigger adjustment of the ANC 120 and/or the audio playback 128. For example, the audio playback manager 108 may be configured to interrupt the ANC 120 and/or the audio playback 128 for all audio sources except for selected audio sources, which the audio playback manager 108 ignores.

In other example implementations, the audio playback manager 108 may be configured to detect that an audio source 138 is audible without detecting a trigger word 130. For example, the audio playback manager 108 can leverage the audio sensor 204 and/or the machine learning model 202 to determine active audio originating from at least one audio source 138. The machine learning model 202, for example, may additionally be trained on prior phone call audio, microphone audio, social media data, or other data to detect the at least one audio source 138.

Figure 8:
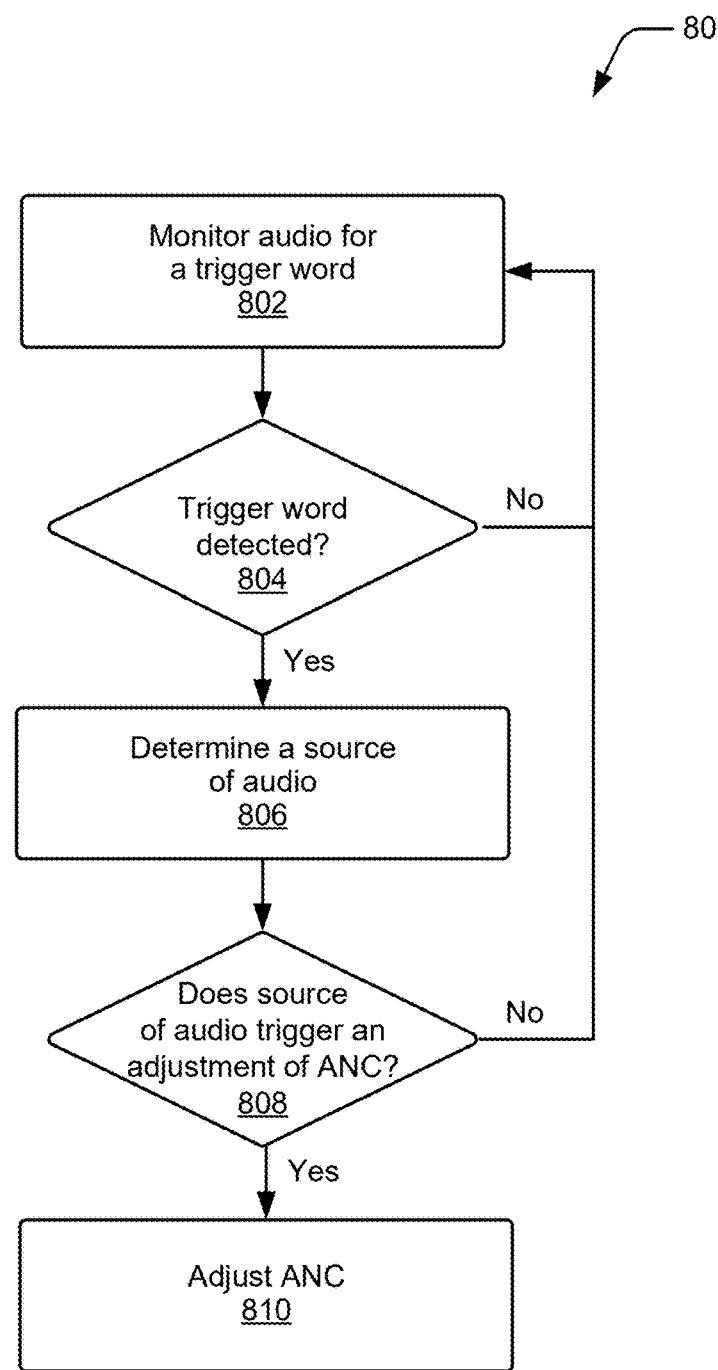
FIG. 8 is a flowchart illustrating an example of ending active noise cancellation based on a detected audio source in accordance with one or more implementations as described herein.

FIG. 8 is a flowchart illustrating an example method 800 of ending active noise cancellation based on a detected audio source, as described herein. In this example at 802, audio in an environment of a mobile device 102 is monitored for determining, at 804, if a trigger word 130 is detected. The mobile device 102, for example communicates audio playback 128 to a headset 104, which implements ANC. If no trigger word 130 is detected, then the mobile device 102 and/or the headset 104 (e.g., the audio playback manager 108) continue to monitor the audio for the trigger word 130. If the trigger word 130 is detected at 804, then the mobile device 102 and/or the headset 104 determines at least one audio source 138 at 806. After determining the audio source 138, the mobile device 102 and/or the headset 104 then determines, at 808, if the audio source 138 triggers adjustment of the ANC 120. If the audio source 138 does not trigger adjustment of the ANC 120, then the mobile device 102 and/or the headset 104 return to monitor the audio for the trigger word 130. If the audio source 138 does trigger adjustment of the ANC 120 at 808, then at 810, the mobile device 102 and/or the headset 104 adjusts the ANC 120.

Example methods 400, 600, 800, 900, 1000, and 1100 are described with reference to respective FIGS. 9, 10, and 11 in accordance with one or more implementations of ending audio playback based on a trigger word, including presenting relevant audio data and ending active noise cancellation based on a detected audio source, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 9 illustrates example method(s) 900 for ending audio playback based on a trigger word. The order in which the method is described is not intended to be construed as a limitation, and any number or combination of the described method operations may be performed in any order to perform a method, or an alternate method.

At 902, a headset is detected in communication with a mobile device, the headset causing ANC and outputting audio playback communicated from the mobile device. For example, the audio playback manager 108 detects a headset 104 in communication with a mobile device 102, the headset 104 causing ANC 120 and outputting audio playback 128 communicated from the mobile device 102.

At 904, a trigger word is detected that is audible in an environment of the mobile device using a microphone associated with the mobile device. For example, the audio playback manager 108 detects, using a microphone 126 associated with the mobile device 102, a trigger word 130 that is audible in an environment of the mobile device 102. For example, the trigger word 130 is a name of a user of the mobile device 102. In some example implementations, the audio playback manager 108 determines the trigger word 130 using a machine learning model 202. For example, the machine learning model 202 is trained on user interactions with the mobile device 102. In some example implementations, the audio playback manager 108 detects a location of the mobile device 102 in the environment, and the trigger word 130 is associated with a location. For example, the trigger word 130 is one of multiple trigger words associated with a user of the mobile device 102. In some example implementations, the audio playback manager 108 detects the trigger word 130 using a microphone 126 associated with the mobile device 102 or the headset 104.

At 906, the audio playback is ended in response to detecting the trigger word. For example, the audio playback manager 108 ends the audio playback 128 in response to detecting the trigger word 130. In some example implementations, the audio playback manager 108 ends the audio playback 128 and adjusts the ANC 120 of the headset 104 in response to determining the mobile device 102 is located at the location associated with the trigger word 130.

At 908, the ANC of the headset is adjusted in response to detecting the trigger word. For example, the audio playback manager 108 adjusts the ANC 120 of the headset 104 in response to detecting the trigger word 130. In some example implementations, adjusting the ANC 120 includes lowering a level of the ANC 120 or increasing the level of the ANC 120.

FIG. 10 illustrates example method(s) 1000 for presenting relevant audio data. The order in which the method is described is not intended to be construed as a limitation, and any number or combination of the described method operations may be performed in any order to perform a method, or an alternate method.

At 1002, audio is monitored in an environment for one or more trigger words. For example, the audio playback manager 108 monitors audio in an environment for one or more trigger words 130. For example, the trigger word 130 is a name of a user of the mobile device 102. In some example implementations, the audio playback manager 108 determines the trigger word 130 using a machine learning model 202. For example, the machine learning model 202 is trained on user interactions with the mobile device 102.

At 1004, a trigger word of the one or more trigger words is detected. For example, the audio playback manager 108 detects a trigger word 130 of the one or more trigger words 130. In some example implementations, the audio playback manager 108 detects the trigger word 130 using a microphone 126 associated with the mobile device 102 or the headset 104.

At 1006, a portion of the audio preceding the trigger word is determined relevant to a user. For example, the audio playback manager 108 determines whether a portion of the audio preceding the trigger word 130 is relevant to a user. In some example implementations, the audio playback manager 108 uses a machine learning model 202 to determine whether the portion of the audio preceding the trigger word 130 is relevant to the user. For example, the machine learning model 202 is trained using previous user communications. In some example implementations, the portion of the audio that is relevant to the user is taken from a recording of the audio in the environment captured by a microphone 126.

At 1008, the portion of the audio that is relevant to the user is presented. For example, the audio playback manager 108 presents the portion of the audio that is relevant to the user. In some example implementations, the audio playback manager 108 generates a transcript of the portion of the audio that is relevant to the user for display on a mobile device 102. In some example implementations, the audio playback manager 108 initiates audio playback of a recording of the portion of the audio that is relevant to the user. For example, background audio is removed from the recording.

FIG. 11 illustrates example method(s) 1100 for ending active noise cancellation based on a detected audio source. The order in which the method is described is not intended to be construed as a limitation, and any number or combination of the described method operations may be performed in any order to perform a method, or an alternate method.

At 1102, a headset is detected that employing ANC of audio in communication with the mobile device in an environment of the mobile device. For example, the audio playback manager 108 detects a headset 104 employing ANC of audio in communication with a mobile device 102 in an environment of the mobile device 102.

At 1104, a selection of at least one audio source that triggers adjustment of the ANC is received. For example, the audio playback manager 108 receives a selection of at least one audio source 138 that triggers adjustment of the ANC 120. For example, the at least one audio source 138 that triggers adjustment of the ANC 120 is determined based on a user input. In some example implementations, the audio playback manager 108 determines a selection of the at least one audio source 138 using a machine learning model 202. For example, the machine learning model 202 is trained on manual user adjustments to the ANC 120 in response to detected audio.

At 1106, sound is detected as originating from the at least one audio source that triggers adjustment of the ANC. For example, the audio playback manager 108 detects sound originating from the at least one audio source 138 that triggers adjustment of the ANC 120. For example, the at least one audio source 138 is a person speaking. In some example implementations, the audio playback manager 108 ignores sounds determined to originate from sources other than the at least one audio source 138.

At 1108, the ANC is adjusted based on detecting the sound originating from the at least one audio source. For example, the audio playback manager 108 adjusts the ANC 120 based on detecting the sound originating from the at least one audio source 138. In some example implementations, the audio playback manager 108 pauses an audio playback from the mobile device 102 in response to detecting the sound originating from the at least one audio source 138.

Figure 12:
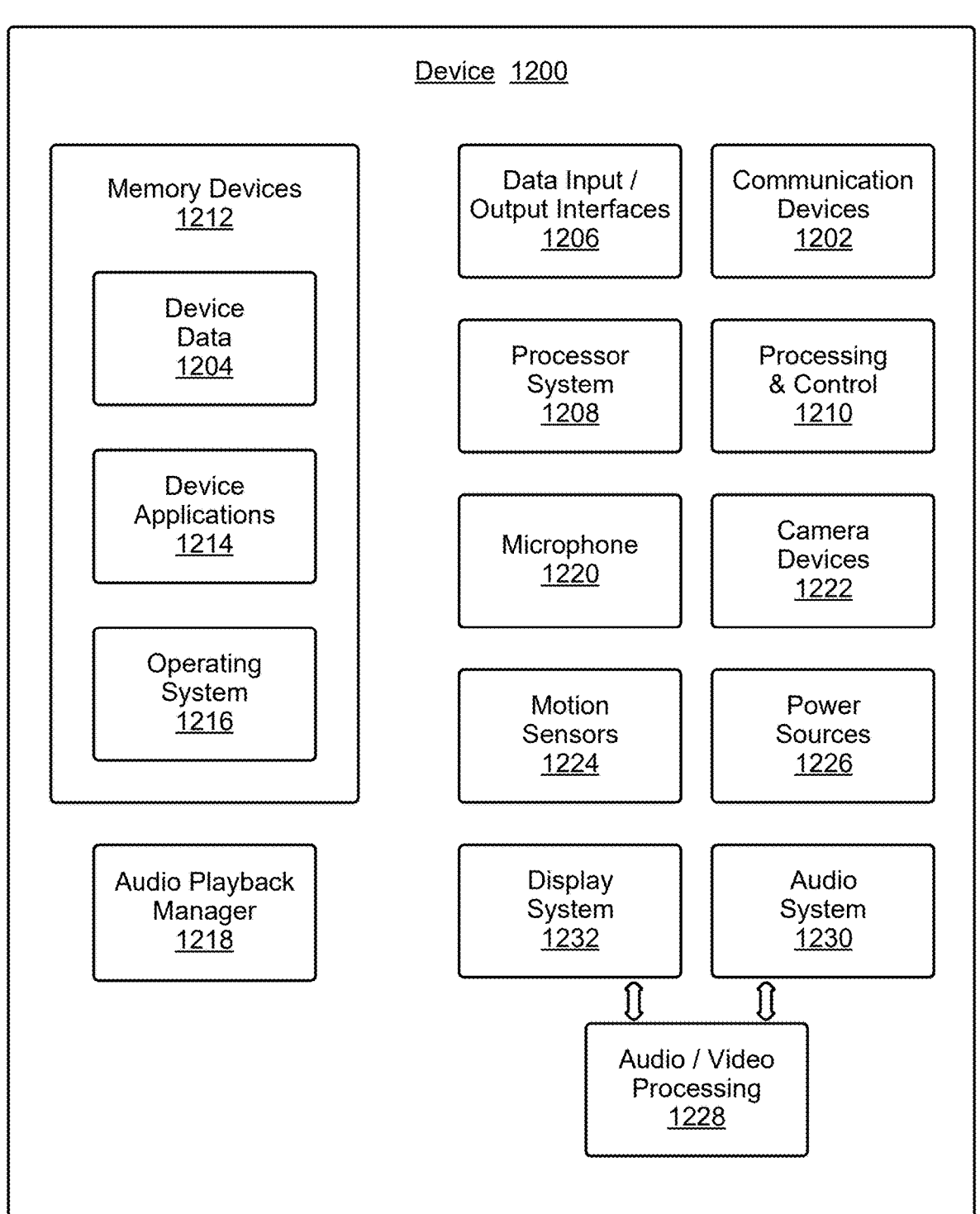
FIG. 12 illustrates various components of an example device that may be used to implement the techniques for ending audio playback based on a trigger word, presenting relevant audio data, and ending active noise cancellation based on a detected audio source in accordance with one or more implementations as described herein.

FIG. 12 illustrates various components of an example device 1200, which can implement aspects of the techniques and features for ending audio playback based on a trigger word, presenting relevant audio data, and/or ending active noise cancellation based on a detected audio source, as described herein. The example device 1200 may be implemented as any of the devices described with reference to the previous FIGS. 1-11, such as any type of a wireless device, mobile device, mobile phone, flip phone, client device, companion device, display device, tablet, computing, communication, entertainment, gaming, media playback, and/or any other type of computing, consumer, and/or electronic device. For example, the mobile device 102 described with reference to FIGS. 1-11 may be implemented as the example device 1200.

The example device 1200 can include various, different communication devices 1202 that enable wired and/or wireless communication of device data 1204 with other devices. The device data 1204 can include any of the various devices data and content that is generated, processed, determined, received, stored, and/or communicated from one computing device to another. Generally, the device data 1204 can include any form of audio, video, image, graphics, and/or electronic data that is generated by applications executing on a device. The communication devices 1202 can also include transceivers for cellular phone communication and/or for any type of network data communication.

The example device 1200 can also include various, different types of data input/output (I/O) interfaces 1206, such as data network interfaces that provide connection and/or communication links between the devices, data networks, and other devices. The data I/O interfaces 1206 may be used to couple the device to any type of components, peripherals, and/or accessory devices, such as a computer input device that may be integrated with the example device 1200. The I/O interfaces 1206 may also include data input ports via which any type of data, information, media content, communications, messages, and/or inputs may be received, such as user inputs to the device, as well as any type of audio, video, image, graphics, and/or electronic data received from any content and/or data source.

The example device 1200 includes a processor system 1208 of one or more processors (e.g., any of microprocessors, controllers, and the like) and/or a processor and memory system implemented as a system-on-chip (SoC) that processes computer-executable instructions. The processor system 1208 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 610. The example device 1200 may also include any type of a system bus or other data and command transfer system that couples the various components within the device. A system bus can include any one or combination of different bus structures and architectures, as well as control and data lines.

The example device 1200 also includes memory and/or memory devices 1212 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 1212 include volatile memory and non-volatile memory, fixed and removable media devices, and any suitable memory device or electronic data storage that maintains data for computing device access. The memory devices 1212 can include various implementations of random-access memory (RAM), read-only memory (ROM), flash memory, and other types of storage media in various memory device configurations. The example device 1200 may also include a mass storage media device.

The memory devices 1212 (e.g., as computer-readable storage memory) provide data storage mechanisms, such as to store the device data 1204, other types of information and/or electronic data, and various device applications 1214 (e.g., software applications and/or modules). For example, an operating system 1216 may be maintained as software instructions with a memory device 1212 and executed by the processor system 1208 as a software application. The device applications 1214 may also include a device manager, such as any form of a control application, software application, signal-processing and control module, code that is specific to a particular device, a hardware abstraction layer for a particular device, and so on.

In this example, the device 1200 includes an audio playback manager 1218 that implements various aspects of the described features and techniques described herein. The audio playback manager 1218 may be implemented with hardware components and/or in software as one of the device applications 1214, such as when the example device 1200 is implemented as the mobile device 102 described with reference to FIGS. 1-11. An example of the audio playback manager 1218 is the audio playback manager 108 implemented by the mobile device 102, such as a software application and/or as hardware components in the mobile device. In implementations, the audio playback manager 1218 may include independent processing, memory, and logic components as a computing and/or electronic device integrated with the example device 1200.

The example device 1200 can also include a microphone 1220 (e.g., to capture an audio recording) and/or camera devices 1222 (e.g., to capture video images), as well as device sensors 1224, such as may be implemented as components of an inertial measurement unit (IMU). The device sensors 1224 may be implemented with various sensors, such as a gyroscope, an accelerometer, and/or other types of motion sensors to sense motion of the device. The device sensors 1224 can generate sensor data vectors having three-dimensional parameters (e.g., rotational vectors in x, y, and z-axis coordinates) indicating location, position, acceleration, rotational speed, and/or orientation of the device. The example device 1200 can also include one or more power sources 1226, such as when the device is implemented as a wireless device and/or a mobile device. The power sources may include a charging and/or power system, and may be implemented as a flexible strip battery, a rechargeable battery, a charged super-capacitor, and/or any other type of active or passive power source.

The example device 1200 can also include an audio and/or video processing system 1228 that generates audio data for an audio system 1230 and/or generates display data for a display system 1232. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 1200. Alternatively, the audio system and/or the display system are external, peripheral components to the example device.

Although implementations for ending audio playback based on a trigger word, presenting relevant audio data, and ending active noise cancellation based on a detected audio source have been described in language specific to features and/or methods, the appended claims are not necessarily limited to the specific features or methods described. Rather, the specific features and methods are disclosed as example implementations for ending audio playback based on a trigger word, presenting relevant audio data, and ending active noise cancellation based on a detected audio source, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

In some aspects, the techniques described herein relate to a mobile device, including at least one processor coupled with a memory, and an audio playback manager configured to cause the mobile device to monitor audio in an environment for a trigger word, detect the trigger word via a microphone associated with a headset in communication with the mobile device, determine whether a portion of the audio preceding the trigger word is relevant to a user of the mobile device, and present the portion of the audio that is relevant to the user.

In some aspects, the techniques described herein relate to a mobile device, wherein the audio playback manager is configured to generate a transcript of the portion of the audio that is relevant to the user for display on the mobile device.

In some aspects, the techniques described herein relate to a mobile device, wherein the audio playback manager is configured to initiate audio playback of a recording of the portion of the audio that is relevant to the user.

In some aspects, the techniques described herein relate to a mobile device, wherein background audio is removed from the recording.

In some aspects, the techniques described herein relate to a mobile device, wherein the audio playback manager is configured to use a machine learning model to determine whether the portion of the audio preceding the trigger word is relevant to the user of the mobile device.

In some aspects, the techniques described herein relate to a mobile device, wherein the machine learning model is trained using previous user communications.

In some aspects, the techniques described herein relate to a mobile device, wherein the portion of the audio that is relevant to the user is taken from a recording of the audio in the environment captured by the microphone.

In some aspects, the techniques described herein relate to a mobile device, wherein the audio playback manager is configured to pause an audio playback communicated from the mobile device to present the portion of the audio that is relevant to the user.

In some aspects, the techniques described herein relate to a mobile device, wherein the audio playback manager is configured to end ANC from the mobile device to present the portion of the audio that is relevant to the user.

In some aspects, the techniques described herein relate to a method, including monitoring audio in an environment for one or more trigger words, detecting a trigger word of the one or more trigger words, determining whether a portion of the audio preceding the trigger word is relevant to a user, and presenting the portion of the audio that is relevant to the user.

In some aspects, the techniques described herein relate to a method, further including generating a transcript of the portion of the audio that is relevant to the user for display on a mobile device.

In some aspects, the techniques described herein relate to a method, further including initiating audio playback of a recording of the portion of the audio that is relevant to the user.

In some aspects, the techniques described herein relate to a method, wherein background audio is removed from the recording.

In some aspects, the techniques described herein relate to a method, further including determining whether the portion of the audio preceding the trigger word is relevant to the user of a mobile device using a machine learning model.

In some aspects, the techniques described herein relate to a method, wherein the machine learning model is trained using previous user communications.

In some aspects, the techniques described herein relate to a method, wherein the portion of the audio that is relevant to the user is taken from a recording of the audio in the environment captured by a microphone.

In some aspects, the techniques described herein relate to a system, including a headset in communication with a mobile device, and a processor configured to implement an audio playback manager to detect a trigger word in an environment via a microphone associated with at least one of the headset or the mobile device, determine whether a portion of audio preceding the trigger word is relevant to a user of the mobile device, and present the portion of the audio that is relevant to the user.

In some aspects, the techniques described herein relate to a system, wherein the audio playback manager is configured to generate a transcript of the portion of the audio that is relevant to the user for display on the mobile device.

In some aspects, the techniques described herein relate to a system, wherein the audio playback manager is configured to initiate audio playback of a recording of the portion of the audio that is relevant to the user.

In some aspects, the techniques described herein relate to a system, wherein the audio playback manager is configured to use a machine learning model to determine whether the portion of the audio preceding the trigger word is relevant to the user of the mobile device.

The invention claimed is:

1. A mobile device, comprising:
   at least one processor coupled with a memory; and
   an audio playback manager configured to cause the mobile device to:
      detect active noise cancellation (ANC) performed by a headset, the headset in communication with the mobile device;
      capture external audio via a microphone;
      monitor the external audio for a trigger word by processing the external audio;
      detect the trigger word in the external audio;
      determine whether a portion of the external audio preceding the trigger word is relevant to a user of the mobile device using a machine learning model; and
      present the portion of the external audio that is relevant to the user and cause the headset to pause the ANC.

2. The mobile device of claim 1, wherein the audio playback manager is configured to generate a transcript of the portion of the external audio that is relevant to the user for display on the mobile device.

3. The mobile device of claim 1, wherein the audio playback manager is configured to initiate audio playback of a recording of the portion of the external audio that is relevant to the user.

4. The mobile device of claim 3, wherein background audio is removed from the recording.

5. The mobile device of claim 1, wherein the audio playback manager is configured to use the machine learning model to determine the trigger word.

6. The mobile device of claim 5, wherein the machine learning model is trained using previous user communications.

7. The mobile device of claim 1, wherein the portion of the external audio that is relevant to the user is taken from a recording of the external audio captured by the microphone.

8. The mobile device of claim 1, wherein the audio playback manager is configured to pause an audio playback communicated from the mobile device to present the portion of the external audio that is relevant to the user.

9. The mobile device of claim 1, wherein the audio playback manager is configured to cause the headset to resume the ANC after presenting the portion of the external audio that is relevant to the user and determining that subsequent external audio is not relevant to the user.

10. A method, comprising:

detecting, by a mobile device, active noise cancellation (ANC) performed by a headset;

capturing external audio via a microphone;

monitoring the external audio for one or more trigger words by processing the external audio;

detecting a trigger word of the one or more trigger words in the external audio;

determining whether a portion of the external audio preceding the trigger word is relevant to a user using a machine learning model; and presenting, by the mobile device, the portion of the external audio that is relevant to the user and causing the headset to pause the ANC.

11. The method of claim 10, further comprising generating a transcript of the portion of the external audio that is relevant to the user for display on the mobile device.

12. The method of claim 10, further comprising initiating audio playback of a recording of the portion of the external audio that is relevant to the user.

13. The method of claim 12, wherein background audio is removed from the recording.

14. The method of claim 10, further comprising determining the trigger word using the machine learning model.

15. The method of claim 14, wherein the machine learning model is trained using previous user communications.

16. The method of claim 10, wherein the portion of the external audio that is relevant to the user is taken from a recording of the external audio captured by the microphone.

17. A system, comprising:

a headset in communication with a mobile device; and a processor configured to implement an audio playback manager to:

detect active noise cancellation (ANC) performed by the headset;

capture external audio via a microphone;

detect a trigger word in the external audio by processing the external audio;

determine whether a portion of the external audio preceding the trigger word is relevant to a user of the mobile device using a machine learning model; and present the portion of the external audio that is relevant to the user and cause the headset to pause the ANC.

18. The system of claim 17, wherein the audio playback manager is configured to generate a transcript of the portion of the external audio that is relevant to the user for display on the mobile device.

19. The system of claim 17, wherein the audio playback manager is configured to initiate audio playback of a recording of the portion of the external audio that is relevant to the user.

20. The system of claim 17, wherein the audio playback manager is configured to use the machine learning model to determine the trigger word.

* * * * *